United States Patent
Imbimbo et al.

(10) Patent No.: US 10,091,249 B2
(45) Date of Patent: Oct. 2, 2018

(54) METHOD AND SYSTEM FOR SYNCHRONIZATION OF TWO DATABASES IN A LAWFUL INTERCEPTION NETWORK BY COMPARING CHECKSUM VALUES

(71) Applicant: TELEFONAKTIEBOLAGET L M ERICSSON (PUBL), Stockholm (SE)

(72) Inventors: Amedeo Imbimbo, Caivano (IT); Lorenzo Fiorillo, San Nicola la Strada (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 190 days.

(21) Appl. No.: 15/037,086

(22) PCT Filed: Nov. 22, 2013

(86) PCT No.: PCT/SE2013/051378
§ 371 (c)(1),
(2) Date: May 17, 2016

(87) PCT Pub. No.: WO2015/076715
PCT Pub. Date: May 28, 2015

(65) Prior Publication Data
US 2016/0301718 A1    Oct. 13, 2016

(51) Int. Cl.
*H04L 29/06*   (2006.01)
*G06F 21/64*   (2013.01)
*H04L 9/32*    (2006.01)
*H04L 29/08*   (2006.01)

(52) U.S. Cl.
CPC .............. *H04L 63/30* (2013.01); *G06F 21/64* (2013.01); *H04L 9/3239* (2013.01); *H04L 63/12* (2013.01); *H04L 67/145* (2013.01)

(58) Field of Classification Search
CPC ...................................................... H04L 63/30
See application file for complete search history.

(56) References Cited

U.S. PATENT DOCUMENTS

| | | | |
|---|---|---|---|
| 5,649,089 A | | 7/1997 | Kilner |
| 5,765,172 A | * | 6/1998 | Fox ..................... G06F 11/1608 |
| 5,974,574 A | * | 10/1999 | Lennie ................ G06F 11/1451 |
| | | | 714/52 |
| 6,304,882 B1 | * | 10/2001 | Strellis ................ G06F 11/2064 |

(Continued)

FOREIGN PATENT DOCUMENTS

WO    03047205 A1    6/2003

*Primary Examiner* — Shawnchoy Rahman
(74) *Attorney, Agent, or Firm* — Patent Portfolio Builders PLLC (57) ABSTRACT

The present invention relates to methods and Validity securing arrangement and embodiments thereof for effectively securing validity of a target database in a node in a Lawful Interception Network. Said target database is intended to be identical to a source target database. The arrangement comprises a processing means being adapted to send a request for a target database checksum to the node comprising the target database, to receive a response comprising the target database checksum from the requested node, to compare the received target database checksum to a source target database checksum determined for the corresponding source target database, and to send an order to start an audit and synchronisation process if the two compared checksums differ.

28 Claims, 8 Drawing Sheets

(56) References Cited

U.S. PATENT DOCUMENTS

| | | | | |
|---|---|---|---|---|
| 7,200,626 | B1* | 4/2007 | Hoang | G06F 11/0751 |
| 8,145,607 | B1* | 3/2012 | Korshunov | G06F 11/1466 |
| | | | | 707/640 |
| 8,266,676 | B2* | 9/2012 | Hardjono | H04L 63/0823 |
| | | | | 709/229 |
| 8,639,660 | B1* | 1/2014 | Ou | G06F 17/30575 |
| | | | | 707/625 |
| 2003/0037020 | A1* | 2/2003 | Novak | G06F 17/30575 |
| 2004/0249869 | A1* | 12/2004 | Oksanen | G06F 11/1662 |
| 2006/0212465 | A1* | 9/2006 | Fish | G06F 11/1662 |
| 2006/0271603 | A1* | 11/2006 | Mathias | G06F 17/30179 |
| 2007/0073787 | A1* | 3/2007 | Tysowski | G06F 17/30578 |
| 2013/0198171 | A1* | 8/2013 | Shah | G06F 17/30557 |
| | | | | 707/722 |
| 2014/0089786 | A1* | 3/2014 | Hashmi | G06F 17/2247 |
| | | | | 715/234 |
| 2015/0278030 | A1* | 10/2015 | Zhu | G06F 11/2097 |
| | | | | 707/623 |

* cited by examiner

METHOD AND SYSTEM FOR SYNCHRONIZATION OF TWO DATABASES IN A LAWFUL INTERCEPTION NETWORK BY COMPARING CHECKSUM VALUES

This application is a 371 of International Application No. PCT/SE2013/051378, filed Nov. 22, 2013, the disclosure of which is fully incorporated herein by reference.

TECHNICAL FIELD

The invention is related to Lawful Interception applications and in particular to the integrity of the warrant provisioning throughout the whole LI solution.

BACKGROUND

Figure 1:
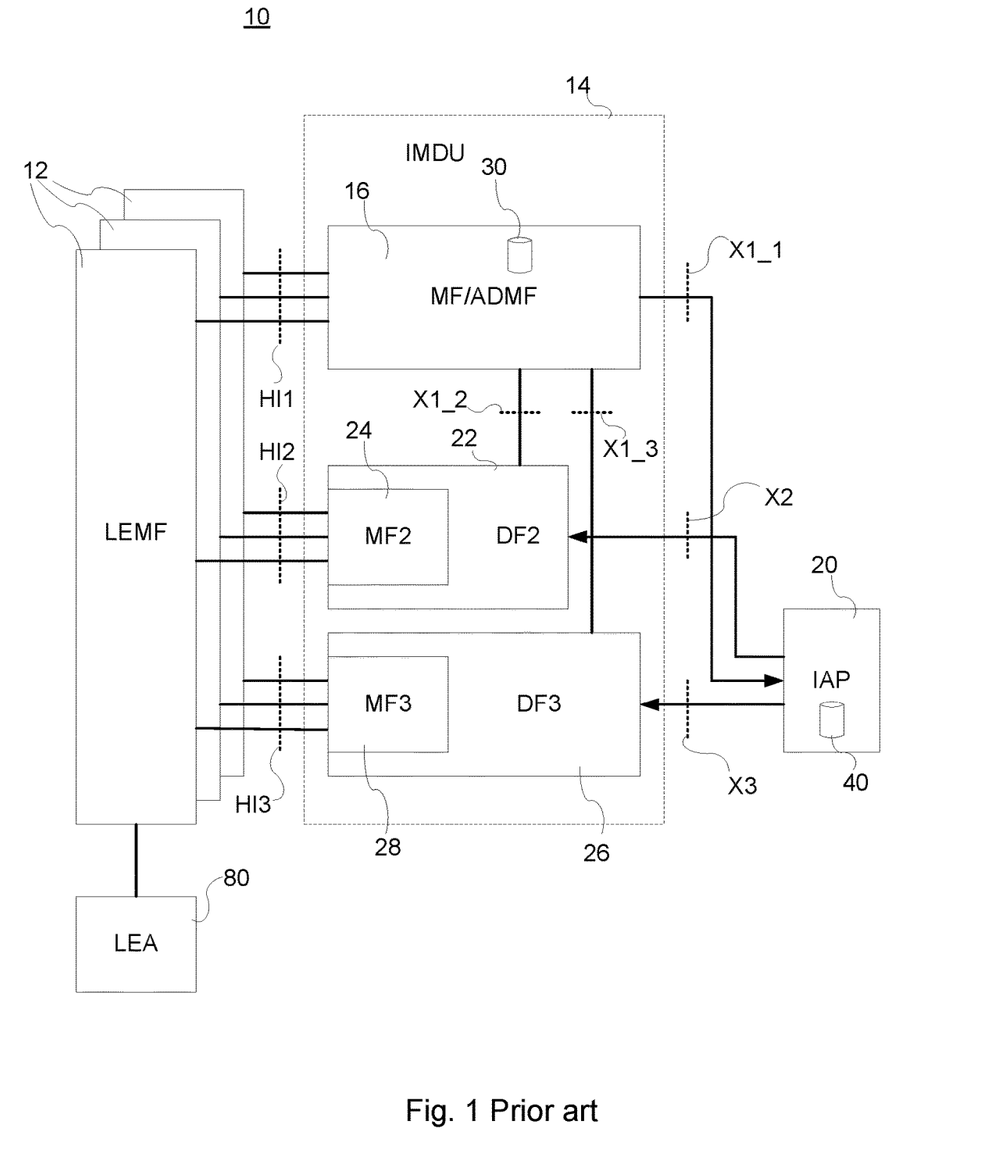
FIG. 1 is a block diagram of an exemplary Lawful Interception system and network according to prior art.

FIG. 1 is a block diagram of an exemplary Lawful Interception (LI) system and network 10 according to prior art. Said system and network comprises a number of entities. The exemplary LI system comprises a Law Enforcement Management Function, LEMF, 12 for requesting LI services of the LI system and collecting the intercepted information of Intercepting Access Point, IAP, nodes in the system. The system shall provide access to the intercepted Content of Communications, CC, and Intercept Related Information, IRI, of a target and services related to the target on behalf of one or more Law Enforcement Agencies, LEAs, 80. An intercept request, also denoted Request for LI activation, is sent through a first Handover Interface, HI1, located between the Law Enforcement Management Function 12 and an Intercept Mediation and Delivery Unit, IMDU, 14 comprising a Mediation Function, MF, 16, involving an Administration Function, ADMF,. Said Mediation Function 16 and Administration Function generate based on said received request a warrant comprising said one or more target identities, and sends said warrant towards an Intercepting Access Point, IAP, 20 via an interface denoted X1_1. The IAP 20 may be connected to a node of a network, e.g. the Internet, a 3 GSM (third Generation Mobile Communications System), etc., from which it intercepts said Content of Communications and Intercept Related Information of a mobile target. Said CC and IRI are network related data. As reference to the standard model, see references [1], [2]and [3], the content of communication is intercepted in the IAP network node and it is based upon duplication of target communication payload without modification. In reference [3], the interfaces HI1 and HI2 is specified in more detail. The IAP sends IRI raw data via an interface X2 to a Delivery Function for IRI reporting, DF2, 22 and a Mediation Function of IRI, MF2, 24 that generates and delivers to a collection functionality a standardized IRI report based on the received IRI report. Said standardized IRI report is sent over a standardized interface HI2 to the LEMF 12. The IAP 20 also sends CC raw data via an interface X3 to a Delivery Function for CC reporting, DF3, 26 and a Mediation Function of IRI, MF3, 28 which generates and delivers to a collection functionality a standardized CC report based on the received CC report. Said standardized CC report is sent over a standardized interface HI3 to the requesting LEMF 12.

Together with the delivery functions it is used to hide from the third generation (3G) IAPs that there might be multiple activations by different Lawful Enforcement Agencies on the same target.

The HI2 and HI3-interfaces represent the interfaces between the LEA and two delivery functions. The delivery functions are used:
  to distribute the Intercept Related Information (IRI) to the relevant LEA(s) via HI2;
  to distribute the Content of Communication (CC) to the relevant LEA(s) via HI3.

According to known internet access services, all the IP streams related to a given target is intercepted and delivered as a whole session data flow regardless any service used within an interception session. If a LEA needs to access specific contents embedded in the whole session streams, it becomes necessary to do an appropriate post-processing of the intercepted data to find the data content of interest.

In the LI solution, the warrant data are stored in a source target database 30 of the mediation function 16 and, during the activation period, they are set on the IAPs 20 and stored in a target database 40 in each IAP 20. The data are not stored in a persistent way in the target databases 40 in the IAP's, i.e. they are lost in case of system shut-down.

Differences between the list of warrants in a target database 40 and the source target database 30 may occur as result of a node entity restart or a communication problem with the entities in the node.

An Audit and Synchronization function ensures the integrity of warrant provisioning within the LI Solution. It aims to guarantee to the User that:
  All of the appropriate warrants are active in the target databases 40 in different IAPs 20;
  There is no un-authorized active warrant;
  Active warrants are aligned with source target database parameters.

This function is crucial since it allows to detect any possible unauthorized access on the target database 40.

A report with all the encountered discrepancies between the target databases 40 in the IAPs 20 and mediation function 16 in the IMDU 14 is produced as result of the audit.

The Synchronization can be optionally requested at the creation of the audit job.

The current LI solutions interwork with very complex telecommunication networks, where:
  Number of IAPs is constantly increasing;
  There are multiple technical identities for the same intercepted subject;
  The number of intercepted subjects/targets is increasing in many countries.

One of the most demanding operations of the LI solution is the Audit functionality, which is used to periodically compare the source target database 30 of the LI management system IMDU 14 versus the target database 40 of all the IAPs 20 in the entire network.

In such complex scenario, from one side the Audit operation becomes more and more essential, from another side, the Audit becomes so demanding that the time needed for completing the whole operation, of checking item per item in the source target database 30 of the MF 16 versus the list of target databases 40 of any of the IAPs 20, might be very long and not always acceptable by the Lawful Enforcement Agencies.

The time between an authorized access to the IAP target database 40 leading to an illegal setting of interception target and the time of its detection is very crucial. Due to the above mentioned complexity of the audit execution, the discovery of a fraudulent interception order can take hours of delay.

SUMMARY

One object with the following disclosure is to provide a solution of the above problems and drawbacks with the known prior art.

According to one aspect of the solution, a method and embodiments thereof for effectively securing validity of a target database in a node of a Lawful Interception Network are disclosed. Said target database is intended to be identical to a source target database. The method may therefore comprise sending a request for a target database checksum to the node comprising the target database, and receiving a response comprising the target database checksum from the requested node. The method further involves comparing the received target database checksum to a source target database checksum determined for the corresponding source target database, and sending an order to start an audit and synchronisation process if the two compared checksums differ.

According to further one aspect of the solution, a Validity securing arrangement and embodiments thereof are disclosed. The Validity securing arrangement is provided for effectively securing validity of a target database in a node in a Lawful Interception Network. Said target database is intended to be identical to a source target database. The arrangement comprises a processing means being adapted to send a request for a target database checksum to the node comprising the target database, to receive a response comprising the target database checksum from the requested node, to compare the received target database checksum to a source target database checksum determined for the corresponding source target database, and to send an order to start an audit and synchronisation process if the two compared checksums differ.

According to further one aspect, a method and embodiments for effectively securing validity of a target database in a node of a Lawful Interception Network are disclosed. Said node comprises a target database, which is intended to be identical to a source target database. The method comprises receiving a request for a target database checksum of the target database and sending a response comprising the target database checksum to an indicated node.

An interception access point, IAP, target database arrangement and embodiments thereof is also disclosed. The method is for effectively securing validity of a target database in a node of a Lawful Interception Network, said node comprising a target database, which is intended to be identical to a source target database. The arrangement comprises a processing means being adapted to receive a request for a target database checksum of the target database and to send a response comprising the target database checksum to an indicated node.

Further, it is provided a computer program comprising computer program code which, when run in a processor of a system, causes the system to perform a method comprising sending a request for a target database checksum to the node comprising the target database, and receiving a response comprising the target database checksum from the requested node. The method further comprises comparing the received target database checksum to a source target database checksum determined for the corresponding source target database, and sending an order to start an audit and synchronisation process if the two compared checksums differ.

According to additionally one aspect, a computer program comprising computer program code which, when run in a processor of a system, causes the system to perform the method steps of receiving a request for a target database checksum of the target database, and sending a response comprising the target database checksum to an indicated node.

Different embodiments and examples are provided in the dependent claims.

One advantage with the above methods and arrangement is that the validation of target databases associated with a source target database is more effective than known validation and audit methods. Instead of comparing record by record, two checksums are compared.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail.

FIG. 1 is a block diagram illustrating of an exemplary Lawful Interception (LI) system and network 10 according to prior art. Said network and system has already been described in the background section above.

Figure 2:
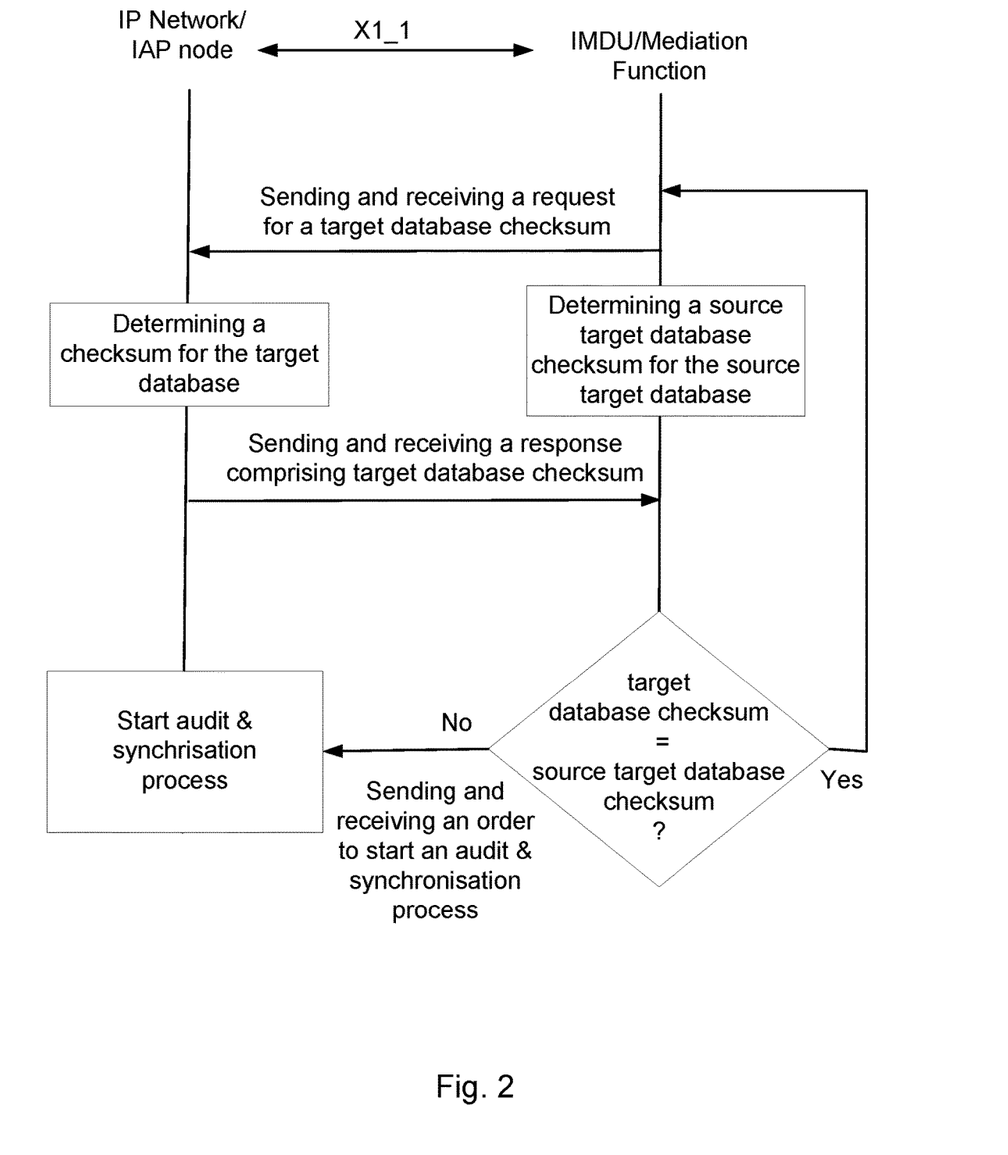
FIG. 2 is a message and signalling chart illustrating a new functionality compared to known Lawful Interception system.

FIG. 2 is a message and signalling chart illustrating a new functionality compared to known Lawful Interception system.

The signaling chart illustrates the signaling between an IMDU comprising a Mediation Function and an Interception Access Point, IAP, node in an IP network via an interface denoted X1_1.

The Administration Function generates a request for a target database checksum, and sends said request towards the IAP via the interface X1_1. The IAP receives the request and starts to determine a checksum for the stored target database. The IAP may determine the checksum by means of a calculation unit comprising a checksum algorithm. The calculation unit may be implemented as a digital processor and memory storage comprising the checksum algorithm. The determined target database checksum is sent in a message to the IMDU where the mediation function receives the message. The mediation function comprises a calculation unit comprising the same checksum algorithm as is used in the IAP. The calculation unit of the mediation function determines by calculating a source target database checksum from the source target database.

The IMDU is configured to compare the two checksums, i.e. the target database checksum and the source target database checksum, to each other. If they are identical, the process goes to a stand-by state, wherein the process is waiting for the next periodically request to be sent.

If the two checksums differ, the IMDU is configured to send an order to the IAP node to start an audit and synchronization process. The IAP receives the start order and the IAP starts the full audit and synchronization process, wherein all target records of the target database are checked for records that differs from the corresponding and original records in the source target database. The full audit and synchronization process is a time and bandwidth consuming process for the LI system.

Figure 3:
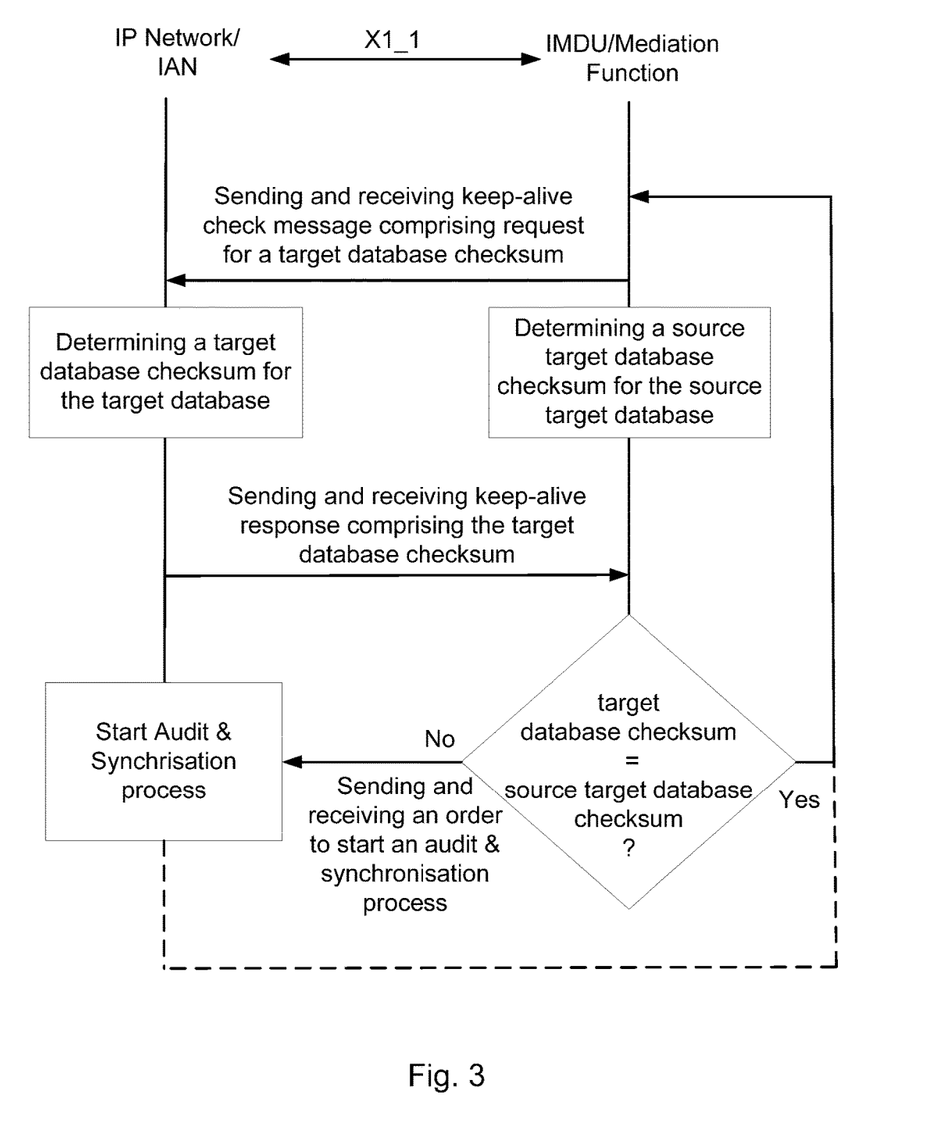
FIG. 3 is a message and signalling chart illustrating an embodiment of the new functionality.

According to another embodiment, which is illustrated in the signaling scheme in FIG. 3, the request for a target database checksum is sent and received in a keep-alive check message. The IAP node responds to the IMDU by sending a keep-alive response comprising the target database checksum. When the IMDU has received the keep-alive response message, the IMDU compares the two checksums. The result of the comparison controls the process either to go to the stand-by state or to start the full audit and synchronization process.

Figure 4:
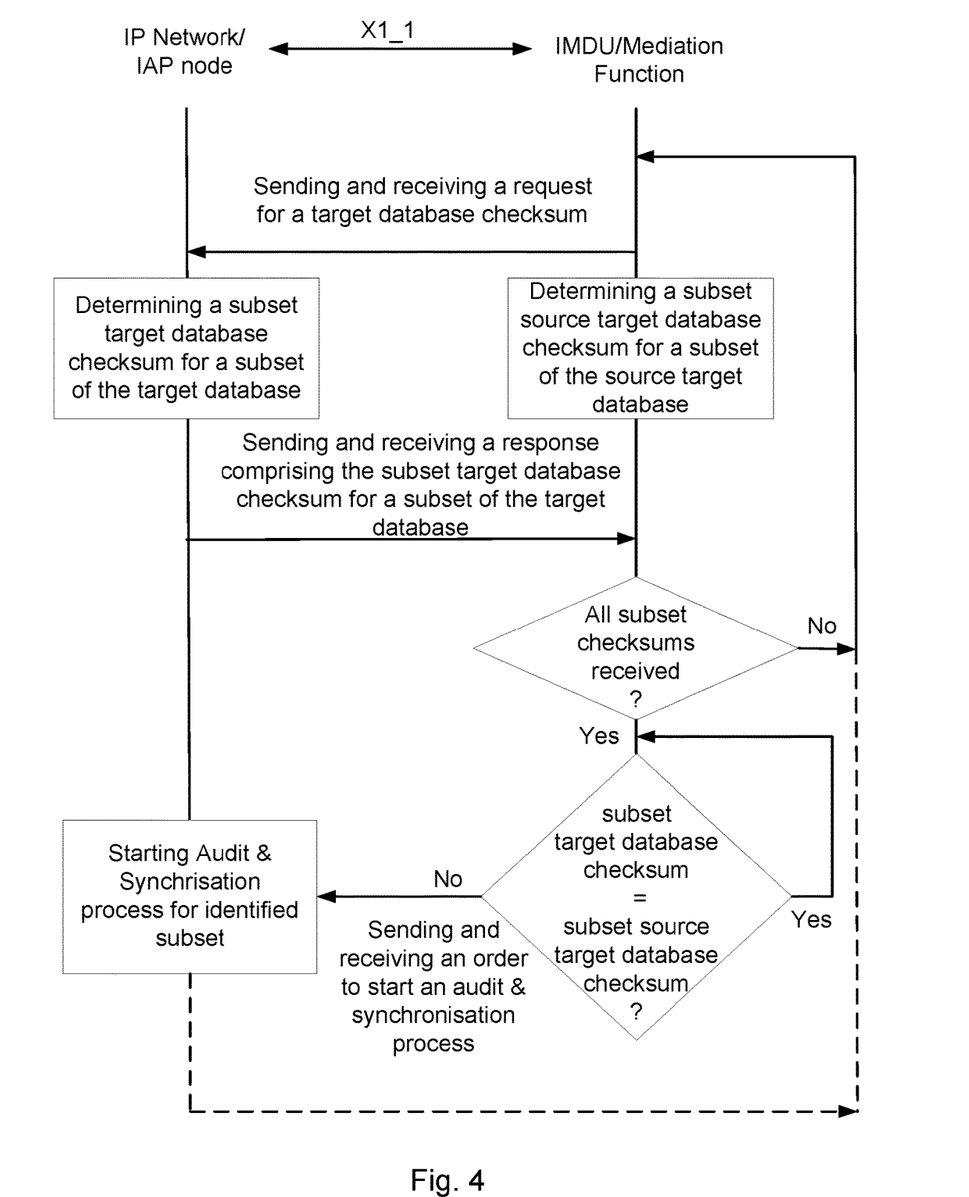
FIG. 4 is a message and signalling chart illustrating further one embodiment of the new functionality.

In FIG. 4, a signaling scheme of further one embodiment is shown. In the illustrated embodiment, the IAP node and the IMDU are configured to calculate one or more subset target database checksums based on one or more subsets of the stored target databases. More specifically, a subset of a target database has one subset target database checksum, which is calculated by means of a checksum algorithm.

Hereafter, a subset target database checksum may be abbreviated to subset checksum.

The Mediation Function generates a request for a target database checksum, and sends said request towards the IAP via the interface X1_1. The IAP receives the request and starts to determine a subset checksum for a subset of the stored target database. A target database or list of targets may be partitioned into subsets, e.g. by using the target identity type. Thus, a subset of targets may consist of Mobile Subscriber Integrated Services Digital Network-Number, MSISDN, target identities. Another subset may consist of all International Mobile Subscriber Identity, IMSI, identities. Yet another partitioning may be to create subsets of targets by applying the MOD X mathematical operation, e.g. at the targets by applying the targets having the same MOD X will belong to the same group.

In case of errors this restricts the problem to one or few small subsets and so enabling the possibility to order the full audit and synchronization operation only towards the identified target subset(s).

The IAP may determine the subset checksum by means of a calculation unit comprising a checksum algorithm. The calculation unit may be implemented as a digital processor and memory storage comprising the checksum algorithm. The determined subset target database checksum is sent in a message to the IMDU where the mediation function receives the message. In some embodiments, the mediation function comprises a calculation unit comprising the same checksum algorithm as is used in the IAP. The calculation unit of the mediation function determines by calculating a subset source target database checksum of the subset of the source target database.

It is tested if all subset checksums have been received from the IAP node. As long as not all subset checksums have been received, the IMDU will generate and send new target database checksum requests to the IAP node.

If all subset checksums have been received from the IAP node, the IMDU is configured to compare two subset checksums of the corresponding subsets, i.e. the subset target database checksum and the subset source target database checksum, to each other. If they are identical, the process goes to a stand-by state, wherein the process is waiting for the next periodically request to be sent.

If the two checksums differ, the IMDU is configured to send an order to the IAP node to start an audit and synchronization process. The IAP receives the start order and the IAP starts an audit and synchronization process for only the corresponding subsets having differing checksums. All target records of the subset target database are checked for records that differ from the corresponding and original records in the subset source target database. The subset audit and synchronization process time is reduced compared to the full audit and synchronization process, which is a time and bandwidth consuming process for the LI system and bandwidth. Thus, the subset audit and synchronization process time has the advantage that it saves time and bandwidth, and it is therefore a capacity saving process.

A checksum or hash sum is a small-size datum computed from an arbitrary block of digital data for the purpose of detecting errors that may have been introduced during its transmission or storage. The integrity of the data can be checked at any later time by recomputing the checksum and comparing it with the stored one. If the checksums match, the data was likely not accidentally altered.

The procedure that yields the checksum from the data is called a checksum function or checksum algorithm. A good checksum algorithm will yield a different result with high probability when the data is accidentally corrupted; if the checksums match, the data has the same high probability of being free of accidental errors.

Checksum functions are related to hash functions, fingerprints, randomization functions, and cryptographic hash functions. However, each of those concepts has different applications and therefore different design goals. It is important to not use a checksum in a security related application, as a checksum does not have the properties required to protect data from intentional tampering.

Check digits and parity bits are special cases of checksums, appropriate for small blocks of data (such as Social Security numbers, bank account numbers, computer words, single bytes, etc.). Some error-correcting codes are based on special checksums that not only detect common errors but also allow the original data to be recovered in certain cases.

The hash is a cryptographic checksum or message integrity code (MIC) that each party must compute to verify the message. For example, the sending computer uses a hash function and shared key to compute the checksum for the message, including it with the packet. The receiving computer must perform the same hash function on the received message and shared key and compare it to the original (included in the packet from the sender). If the message has changed in transit, the hash values are different and the packet is rejected.

Secure Hash Algorithm 1 (SHA1) was developed by the National Institute of Standards and Technology, as described in Federal Information Processing Standard (FIPS) PUB 180-1. The SHA process is closely modeled after MD5. The SHA1 computation results in a 160-bit hash that is used for the integrity check. Because longer hash lengths provide greater security, SHA is stronger than MD5.

Secure Hash Algorithm 1 (SHA1) or Secure Hash Algorithm 2 (SHA2) are recommended to be used as checksum algorithms. These two algorithms ensure there is no collision. In computer science, a collision or clash is a situation that occurs when two distinct pieces of data have the same hash value, checksum, fingerprint, or cryptographic digest. So, if there is no collision, there is no possibility to get false integrity information.

Figure 5:
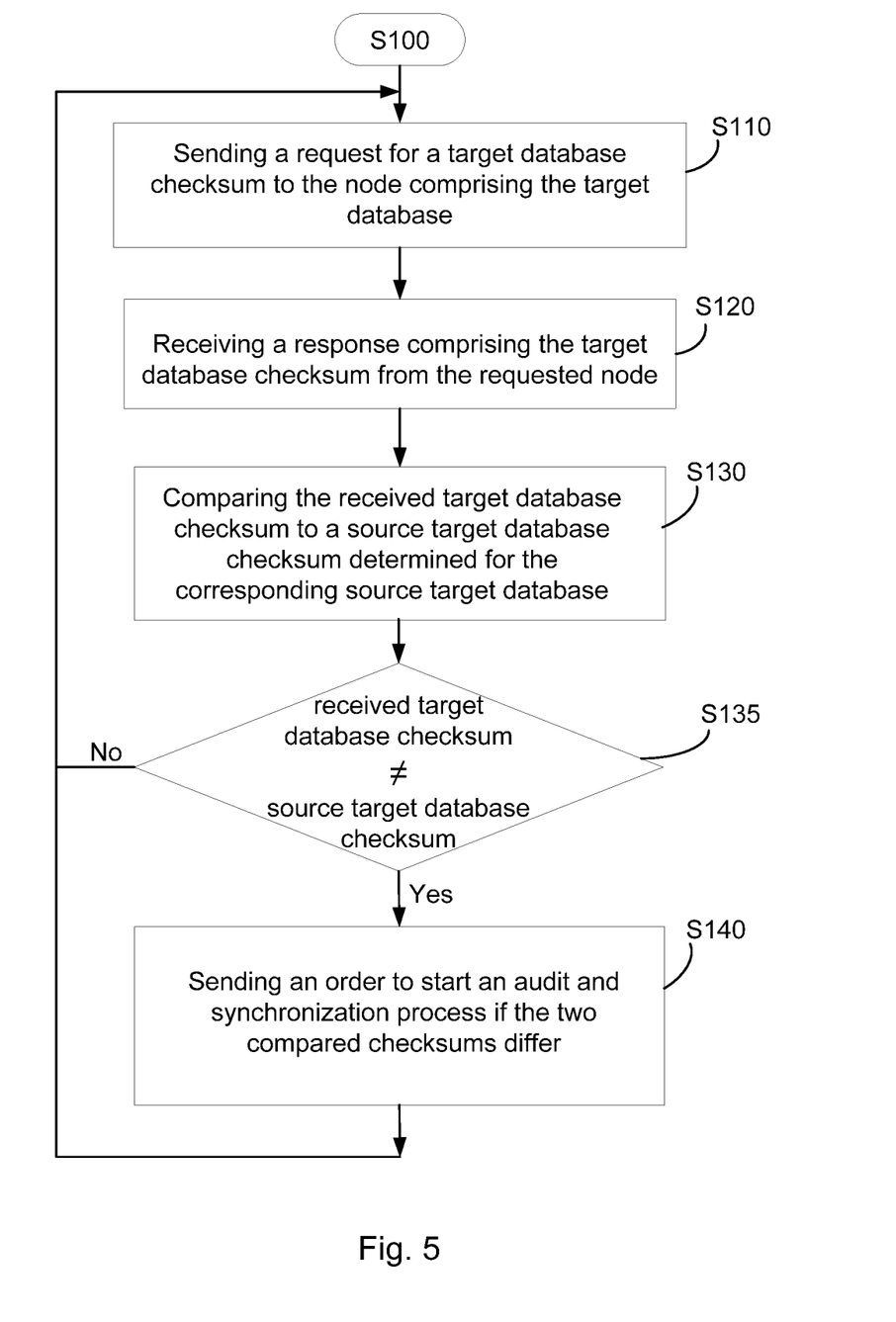
FIG. 5 is a flowchart illustrating an embodiment of a method in an IMDU node.

FIG. 5 is a flowchart illustrating an example of a method for effectively securing validity of a target database in a node of a Lawful Interception Network, e.g. in a node comprising IMDU functionality, e.g. mediation functions. Said target database is intended to be identical to a source target database. The checksums may be determined by means of the same Secure Hash Algorithm.

The method comprises at least following measures:

S110: Sending a request for a target database checksum to the node comprising the target database.

S120: Receiving a response comprising the target database checksum from the requested node.

S130: Comparing the received target database checksum to a source target database checksum determined for the corresponding source target database.

The method further involves comparing the two checksums, i.e. the target database checksum and the source target database checksum, to each other, S135. If they are identical, the process goes to a stand-by state, wherein the process is waiting for the next periodically request to be sent.

If the two checksums differ, the IMDU is configured to send an order to the IAP node to start an audit and synchronization process. The IAP receives the start order and the IAP starts the full audit and synchronization process, wherein all target records of the target database are checked for records that differs from the corresponding and original records in the source target database. The full audit and synchronization process is a time and bandwidth consuming process for the LI system.

S140: Sending an order to start an audit and synchronisation process if the two compared checksums differ.

According to some embodiments, the method sends a request for a target database checksum to the node comprising the target database in a keep-alive check message. The method is an preferably adapted to receive a response comprising the target database checksum from the requested node, said response being a keep-alive response.

In further embodiments, the method may send a request for a target database checksum to the node comprising the target database, wherein the request is a request for a subset checksum based on a subset of the target database. The method is modified to receive a response from the requested node, said response comprising a subset checksum based on the requested subset of the target database. The method further involves sending an order to start an audit and synchronisation process for the subset of the target database for which the subset checksum differ from the corresponding subset of the source target database.

Figure 6:
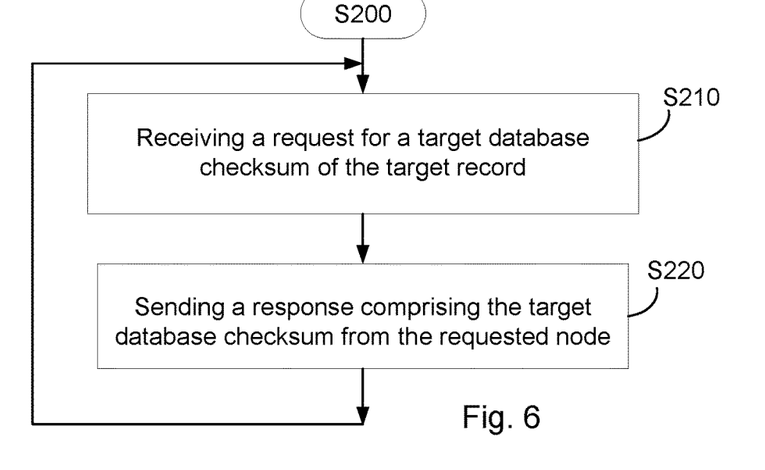
FIG. 6 is a flowchart illustrating an embodiment of a method in an IAP node.

FIG. 6 is a flowchart illustrating a method for effectively securing validity of a target database in a node of a Lawful Interception Network, said node comprising a target database, e.g. a node comprising an Interception Access Point. The target database is intended to be identical to a source target database. The method comprises at least following step:

S210: Receiving a request for a target database checksum of the target database.

The target database checksum of the target database may already have been determined and stored in a memory, according to one example of the method. The target database checksum may be calculated automatically each time a new warrant is or has been received, said warrant comprising target information.

Figure 7:
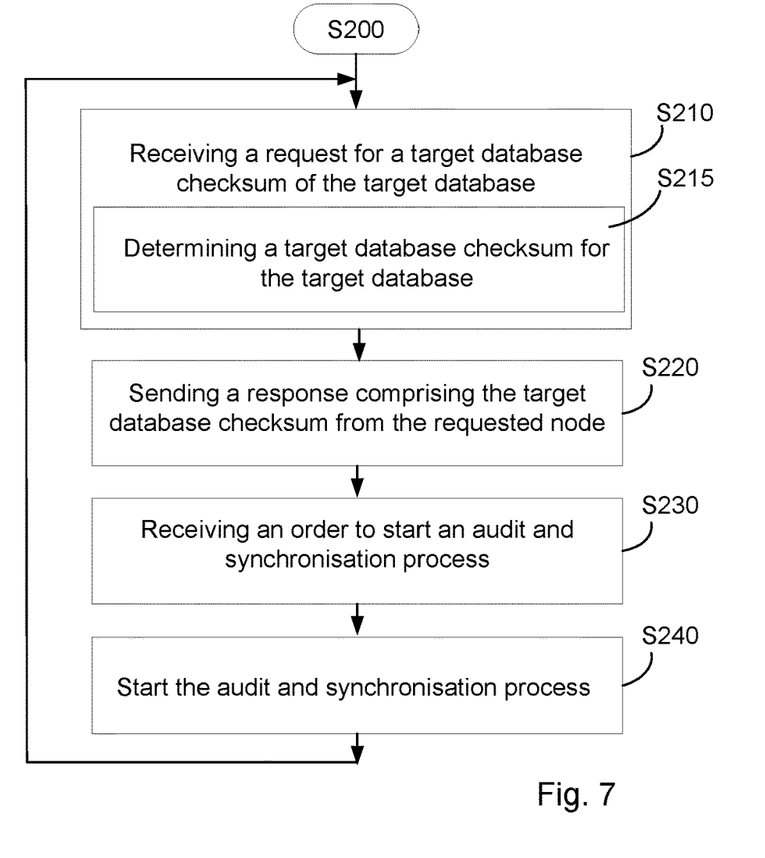
FIG. 7 is a flowchart illustrating further one embodiment of a method in an IAP node.

According to another example of the method, the target checksum is automatically calculated when a request for a target database checksum is received. Said example is illustrated in FIG. 7. The method according to said example comprises:

S215: Determining a target database checksum for the target database.

The target database checksum for the target database may be determined by means of a Secure Hash Algorithm.

Both examples of the method involve the measure:

S220: Sending a response comprising the target database checksum to an indicated node.

If the target database checksum differs from the source target database checksum, the IMDU node is configured to send an order to the IAP node from which the target database checksum in question was received. Thus, the method comprises:

S230: Receiving an order to start an audit and synchronisation process.

When an order to start an audit and synchronisation process has been received, the IMDU node is configured to start and and run the process:

S240: Start the audit and synchronization process.

According to further one example of the method, the receiving of a request, S210, may be modified to receive a request for a target record checksum in a keep-alive check message. The method according this example preferably comprises a modified sending of a response measure, S220, which implies sending a response comprising the target record checksum in a keep-alive response.

According to an alternative method in the IAP node, the receiving of a request, S210, comprises:

Receiving a request for a target database checksum, wherein the request is a request for a subset checksum based on a subset of the target database. In the alternative method, the sending of a response, S220, comprises:

sending a response, said response comprising a subset checksum based on the requested subset of the target database.

In this alternative method, the receiving of an order to start an audit and synchronisation process, S230, comprises:

receiving an order to start an audit and synchronisation process for a subset of the target.

Figure 8:
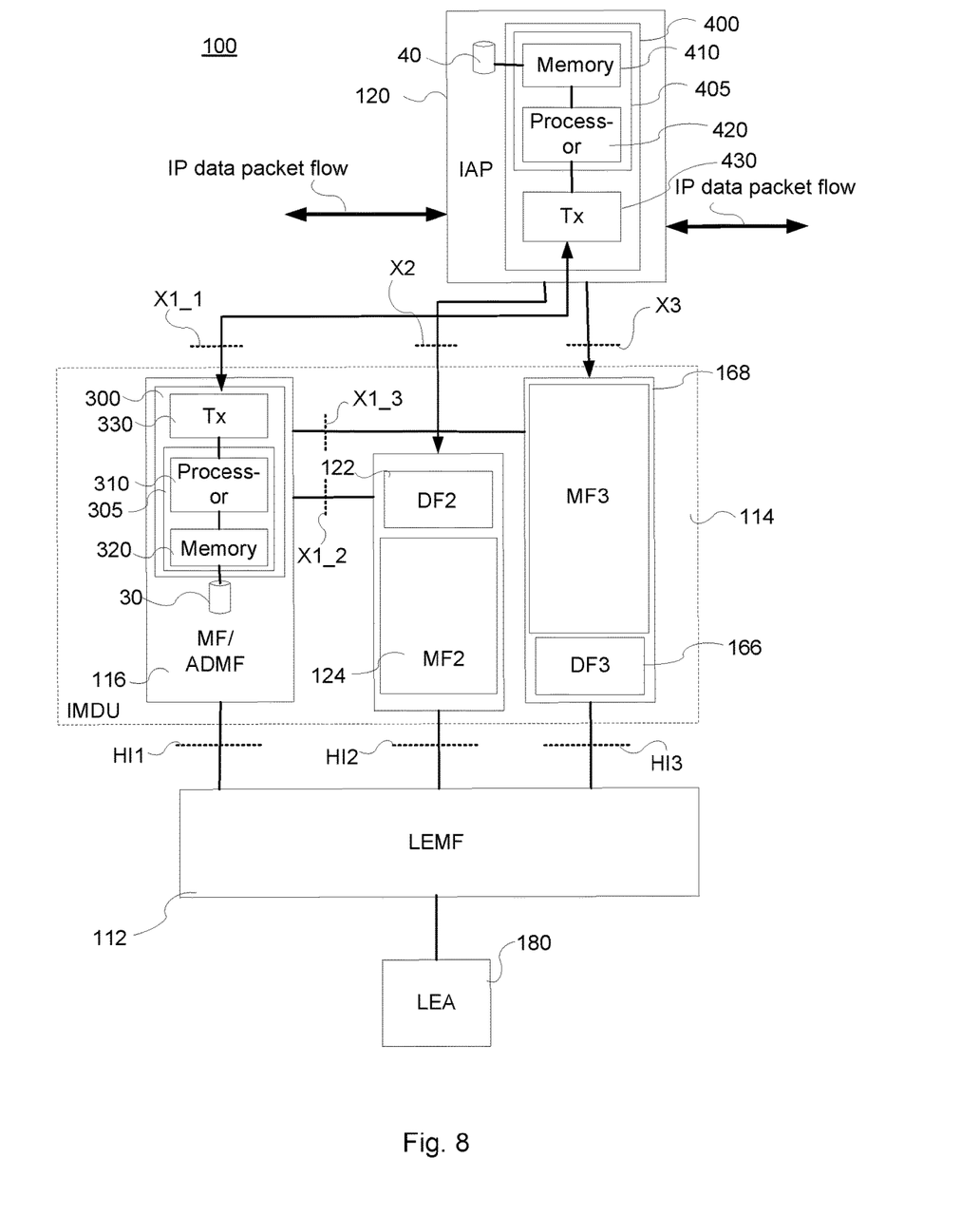
FIG. 8 is a block diagram of an exemplary embodiment of a Lawful Interception system and network arrangement.

FIG. 8 is a block diagram of an exemplary embodiment of a LI system and network comprising an arrangement 300 in the IMDU 114 and an arrangement 400 in the IAP node 120.

This is a LI system that is adapted to provide a LEA, Law Enforcement Agency, 180 with Content of Communication CC and Intercept Related Information IRI from one or more sessions related to one or more target identities.

The LEA 180 sends a LI request to a LEMF, Law Enforcement Management Function, 112. The request specifies different kind of data and information for enabling Lawful Interception regarding data traffic flow of a specific target. An intercept request, also denoted Request for LI activation, is sent through a first Handover Interface, HI1, located between the Law Enforcement Management Function 112 and an IMDU, i.e. an Intercept Mediation and Delivery Unit, 114 comprising a Mediation Function/Delivery Function, MF 116 and an Administration Function, ADMF,. Said Mediation Function 116 and Administration Function generates based on said received request a warrant comprising said one or more target identities, and sends said warrant via a transceiver 330 towards an Interception Access Point, IAP, 120 via an interface denoted X1_1.

The IAP 120 is according to the illustrated embodiments situated in a node of a data communications network or telecommunications network which handles and distributes IP data packet flows from which the IAP intercepts Content of Communications, CC, and Intercept Related Information, IRI, of one or more target's communication sessions. Said CC and IRI are network related data. As reference to the standard model, see references [1], [2] and [3], the content of communication is intercepted in the IAP network traffic node and it is based upon duplication of target communication payload without modification. The IAP 120 comprises a controller comprising a processor unit configured to control the circuitry, units, blocks and functionalities of the IAP 120 and other circuitry.

The IAP 120 is provided with a receiver unit to receive a request with a warrant specifying one or more targets as one or more target identities. The request is an order to intercept IP Data Traffic passing through the traffic node. The IAP 120 may be provided with data acquiring means for intercepting IP data traffic through the node using said one or more target identities.

Thus the IAP 120 is configured to collect payload data of the IP data stream related to one or more target identities, e.g. persons, companies, etc, for which interception has been requested. A sender in the ICE 120 is adapted to forward the collected data to an IMDU 114, who processes the data. Such a process may be filtering and conversion of the data to another format or standard. The processed data is delivered to a Law Enforcement Management Function 112 for further distribution to the requesting LEA 180.

The IAP 120 sends the intercepted payload via an interface X2 to a Mediation Function MF2 124 and a Delivery Function DF2 122 for IRI reporting. The Mediation Function and Delivery Function, MF2/DF2, is configured to generate and deliver to a Collection Functionality (not shown) in the LEMF 112, a standardized IRI report based on the received IRI report comprising metadata related to the CC sent over X3 and HI3. Said standardized IRI report is sent over a standardized interface HI2 to the LEMF 112. The IRI reports comprises metadata is extracted from the application-layer in any IP payload. Metadata examples for different services are:

For an email service: sender address, recipients' addresses, email subject, timestamp, email protocol, mail server address, attachment presence indicator, attachment file names;

For a chat service: chat application name, user identities of involved parties, timestamp, text message;

Web browsing service: timestamp visited URL, visited IP address, HTTP operation, exchanged bytes.

The delivery function unit DF2 122 is used to distribute the Intercept Related Information IRI to the relevant LEA or LEAs via HI2.

The arrangement is adapted to provide a Law Enforcement Agency 180 with payload data of an intercepted Internet Protocol flow, IP flow, wherein the payload data belongs to one or more target identities using a specific Internet service.

The Intercept Mediation and Delivery Unit 114 also involves a Mediation Function/Delivery Function, MF3/DF3 168 configured to receive intercepted payload data from the Intercepting Control Element 120. The intercepted payload belongs to one or more target identities using a specific Internet service. The mediation functionality MF3 168 forwards the IP packets of the received payload data to the Law Enforcement Agency 180 requesting the interception via the handover interface HI3 according to an HI3 protocol.

The Intercept Mediation and Delivery Unit 154 may comprise a second Mediation Functionality MF2 124, which is configured to forward an Intercept Related Information IRI report via the second Handover Interface HI2 to the Law Enforcement Agency. Said report comprises at least metadata which is based on the received payload data which is sent to the Law Enforcement Agency 180 via the handover interface HI3.

The IMDU 114 comprises further a Validity securing arrangement 300 for effectively securing validity of a target database 40 in an IAP 120. Said target database is intended to be identical to a source target database 30. The arrangement 300 may be implemented as a processing means 305 comprising a processor 310 and memory 320. The processing means of the validity securing arrangement 300 is adapted perform the steps of the method S100 and its embodiments, i.e. to send a request for a target database checksum to the node 120 comprising the target database 40, to receive a response comprising the target database checksum from the requested node 120, to compare the received target database checksum to a source target database checksum determined for the corresponding source target database 30, and to send an order to start an audit and synchronisation process if/when the two compared checksums differ.

Thus, the checksums have to be determined by means of the same Secure Hash Algorithm. A calculation unit may be implemented by the digital processor 310 and memory storage 320 comprising the checksum algorithm.

The Validity securing arrangement 300 of the IMDU 114 is configured to compare the two checksums, i.e. the target database checksum and the source target database checksum, to each other. If they are identical, the Validity securing arrangement 300 goes to a stand-by state, wherein the Validity securing arrangement 300 of the IMDU 114 is waiting for the next periodically request to be sent.

If the two checksums differ, the Validity securing arrangement 300 of the IMDU is configured to send an order to the IAP node 120 to start an audit and synchronization process.

The IAP receives the start order and the IAP starts the full audit and synchronization process, wherein all target records of the target database are checked for records that differs from the corresponding and original records in the source target database. The full audit and synchronization process is a time and bandwidth consuming process for the LI system.

According to some embodiments of the validity securing arrangement 300, the processing means 305 is further adapted to send a request for a target database checksum to the node comprising the target database 40 in a keep-alive check message. The processing means 305 of the validity securing arrangement 300 is preferably adapted to receive a response comprising the target database checksum from the requested node 120, said response being a keep-alive response.

According to further embodiments of the validity securing arrangement 300, wherein processing means 305 is further adapted to send a request for a target database checksum to the node 120 comprising the target database, wherein the request is a request for a subset checksum based on a subset of the target database.

The processing means of the validity securing arrangement 300 is preferably adapted to receive a response from the requested node 120, which comprises an IAP. The response comprises a subset checksum based on the requested subset of the target database. The processing means 305 is further adapted to send an order to start an audit and synchronization process for the subset of the target database 40 for which the subset checksum differ from the corresponding subset of the source target database 30.

FIG. 8 further illustrates an Interception Access Point, IAP, target database arrangement 400 for effectively securing validity of a target database 40 in a node 120 of a Lawful Interception Network, preferably an Interception Access Point node 120. Said node comprises or is connected to a target database 40, which is intended to be identical to a source target database 30. The arrangement 400 comprises a processing means 405. Said processing means 405 adapted to receive a request for a target database checksum of the target database 40 and to send a response comprising the target database checksum to an indicated node comprising the IMDU 114 in the LI network 100. The IAP target database arrangement 400 comprises a transceiver 430 for signaling, receiving and sending messages, protocols, e.g. requests, responses, etc.

The processing means 405 of the IAP target database arrangement 400 is further adapted to determine a target database checksum for the target database 40. The target database checksum for the target database is determined by means of a Secure Hash Algorithm. A calculation unit may be implemented by the digital processor 410 and memory storage 420 comprising the checksum algorithm.

The processing means 405 is further adapted to receive an order to start an audit and synchronization process.

The processing means 405 may further be adapted to start and control an audit and synchronization process.

According to some embodiments of the arrangement 400, the processing means 405 may be adapted to receive a request for a target database checksum in a keep-alive check message. The processing means 405 is adapted to send a response comprising the target database checksum, said response being a keep-alive response.

According to further embodiments of the arrangement 400, the processing means 405 may be adapted to receive a request for a target database checksum, wherein the request is a request for a subset checksum based on a subset of the target database. The processing means 405 is further adapted to send a response, said response comprising a subset checksum based on the requested subset of the target database. The processing means 405 of the arrangement 400 is further adapted to receive an order to start an audit and synchronization process for a subset of the target.

Figure 9:
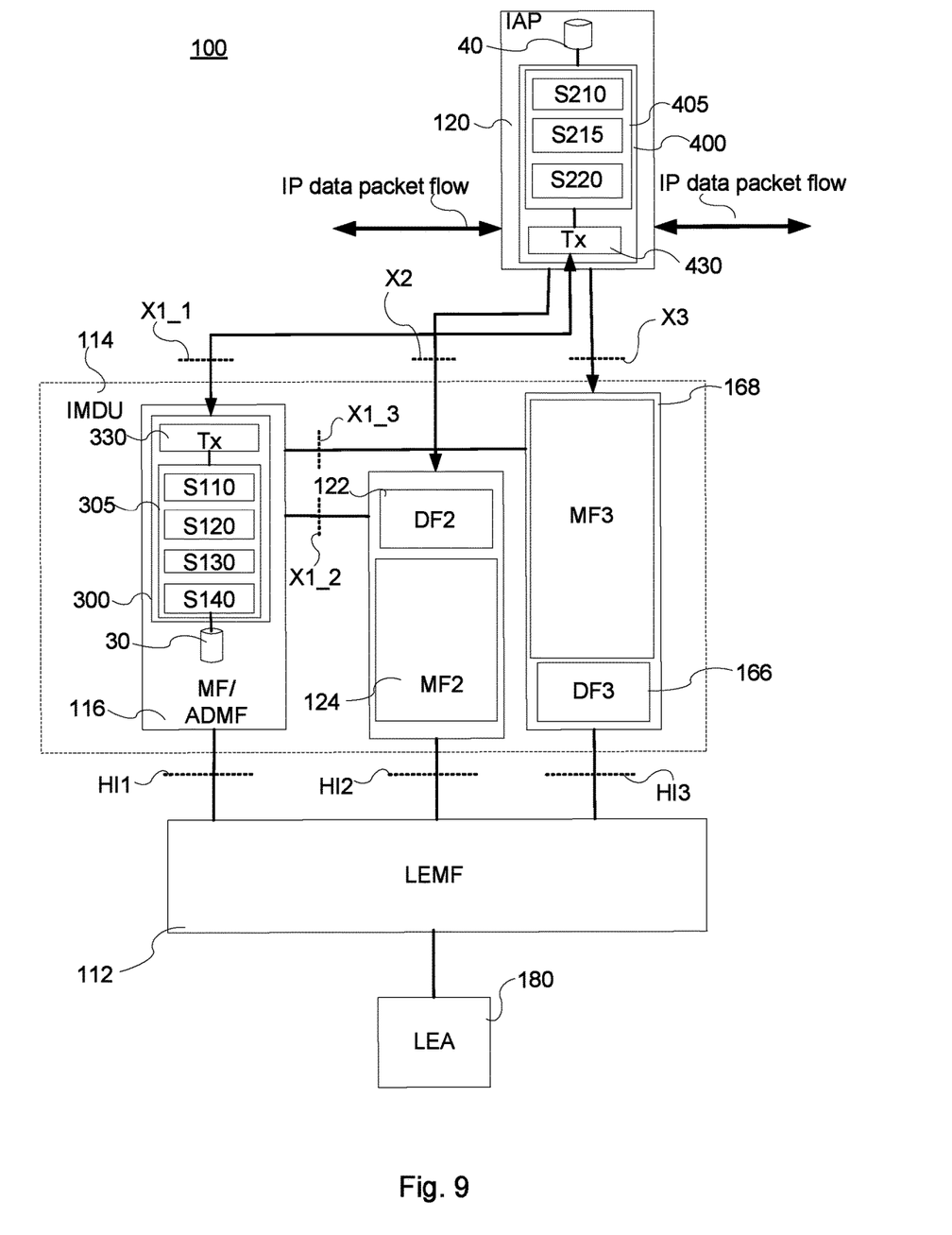
FIG. 9 is a block diagram of another exemplary embodiment of a Lawful Interception system and network arrangement.

FIG. 9 is a block diagram of another exemplary embodiment of an arrangement 300 in the IMDU 114 and an arrangement 400 in the IAP node 120 in a LI system and network, which is similar to the LI system and network described above in FIG. 8.

The IMDU 114 comprises further a Validity securing arrangement 300 for effectively securing validity of a target database 40 in an IAP 120. Said target database is intended to be identical to a source target database 30. The arrangement 300 may be implemented as a processing means 305 comprising a processor 310 and memory 320. The processing means of the validity securing arrangement 300 is adapted perform the steps of the method S100 and its embodiments, A computer program comprising computer program code which, when run in the processor 310, causes the arrangement 300 to perform the method steps:

S110:—sending a request for a target database checksum to the node comprising the target database;

S120:—receiving a response comprising the target database checksum from the requested node;

S130:—comparing the received target database checksum to a source target database checksum determined for the corresponding source target database;

S140:—Sending an order to start an audit and synchronisation process if the two compared checksums differ.

A computer program product comprises a computer program and a computer readable means on which the computer program is stored.

FIG. 9 further illustrates an Interception Access Point, IAP, target database arrangement 400 for effectively securing validity of a target database 40 in a node 120 of a Lawful Interception Network, preferably an Interception Access Point node 120. Said node comprises or is connected to a target database 40, which is intended to be identical to a source target database 30. The arrangement 400 comprises a processing means 405. A computer program comprising computer program code which, when run in the processing means 405, causes the arrangement 400 to perform the method steps:

S210:—receiving a request for a target database checksum of the target database;

S215: Determining a target database checksum for the target database.

S220:—sending a response comprising the target database checksum to an indicated node.

A computer program product comprises a computer program and a computer readable means on which the computer program is stored.

The invention may be implemented in digital electronically circuitry, or in computer hardware, firmware, software, or in combinations of them. Apparatus of the invention may be implemented in a computer program product tangibly embodied in a machine readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such internal hard disks and removable disks; magneto-optical disks; and CD-ROM disks. Any of the foregoing may be supplemented by, or incorporated in, specially—designed ASICs (Application Specific Integrated Circuits).

A number of embodiments of the present invention have been described. It will be understood that various modifications may be made without departing from the scope of the invention. Therefore, other implementations are within the scope of the following claims defining the invention.

REFERENCES

[1] 3GPP TS 33.106 "Lawful Interception requirements (Release 8)";
[2] 3GPP TS 33.107 "Lawful interception architecture and functions (Release 8)";
[3] 3GPP TS 33.108 "Handover interface for Lawful Interception" (Release 8);

The invention claimed is:

1. A method for securing validity of a target database in a node of a Lawful Interception Network, LIN, said target database storing information collected during communications of lawful interception targets and intended to be identically stored in a source target database, the method being performed in a validity securing arrangement of the LIN and comprising:
sending a request for a target database checksum related to one or more of the lawful interception targets, to the node comprising the target database;
receiving a response comprising the target database checksum from the node;
comparing the target database checksum to a source target database checksum related to the one or more lawful interception targets and determined for the source target database; and
sending an order to start an audit and synchronisation process to the node, if the target database checksum differs from the source target database checksum,
wherein the sending of the request, the receiving of the response and the comparing of the target database checksum to the source target database checksum are performed periodically.

2. The method according to claim 1, wherein the target database checksum and the source target database checksum are determined using a same Secure Hash Algorithm.

3. The method according to claim 1, wherein the request for the target database checksum is sent to the node in a keep-alive check message.

4. The method according to claim 3, wherein the response comprising the target database checksum is received from the requested node in a keep-alive response.

5. The method according to claim 1, wherein the request for the target database checksum is a request for a subset checksum based on a subset of the target database.

6. The method according to claim 5, wherein the response from the requested node comprises the subset checksum based on the subset of the target database, and
the order to start the audit and synchronisation process is related to the subset of the target database and is sent if the subset checksum differs from a corresponding subset checksum of the source target database.

7. A validity securing arrangement for securing validity of a target database in a node in a Lawful Interception Network, LIN, said target database storing information collected during communications of lawful interception targets and intended to be identically stored in a source target database of the LIN, the arrangement comprising:

a processor; and
a memory containing instructions that, when executed by the processor, cause the validity securing arrangement to:
send a request for a target database checksum related to one or more of the lawful interception targets to the node;
receive a response comprising the target database checksum from the node;
compare the target database checksum to a source target database checksum related to the one or more lawful interception targets and determined for the source target database; and
send an order to start an audit and synchronisation process to the node, if the target database checksum differs from the source target database checksum,
wherein the instructions causing to send the request, to receive the response and to compare the target database checksum to the source target database checksum are performed periodically.

8. The validity securing arrangement according to claim 7, wherein the target database checksum and the source target database checksum are determined using a same Secure Hash Algorithm.

9. The validity securing arrangement according to claim 7, wherein the request for the target database checksum is sent to the node in a keep-alive check message.

10. The validity securing arrangement according to claim 9, wherein the response comprising the target database checksum is received from the node in a keep-alive response.

11. The validity securing arrangement according to claim 7, wherein the request is a request for a subset checksum based on a subset of the target database.

12. The validity securing arrangement according to claim 11, wherein said response includes the subset checksum based on the subset of the target database; and
the order to start the audit and synchronisation process is related to the subset of the target database and is sent if the subset checksum differs from a corresponding subset checksum of the source target database.

13. A method for securing validity of a target database in a node of a Lawful Interception Network, LIN, said node comprising a target database storing information collected during communications of lawful interception targets and intended to be identically stored in a source target database, the method being performed in the node and comprising:
receiving a request for a target database checksum related to one or more of the lawful interception targets;
sending a response comprising the target database checksum to an indicated node; and
receiving an order to start an audit and synchronisation process when the indicated node has determined that the target database checksum is different from a source target database checksum,
wherein the request is received periodically.

14. The method according to claim 13, wherein the method comprises:
determining the target database checksum for the target database.

15. The method according to claim 14, wherein the target database checksum for the target database is determined using a Secure Hash Algorithm.

16. The method according to claim 13, wherein the request for the target database checksum is received in a keep-alive check message.

17. The method according to claim 16, wherein the response comprising the target database checksum is included in a keep-alive response.

18. The method according to claim 13, wherein the request is a request for a subset checksum based on a subset of the target database.

19. The method according to claim 18, wherein the response comprises the subset checksum.

20. The method according to claim 13, wherein the order to start the audit and synchronisation process is related to subset of the target database.

21. An interception access point, IAP, target database arrangement for securing validity of a target database in a node of a Lawful Interception Network, said node comprising a target database storing information collected during communications of lawful interception targets and intended to be identically stored in a source target database, the arrangement comprising:
a processor; and
a memory containing instructions that, when executed by the processor, cause the arrangement to:
receive a request for a target database checksum related to one or more of the lawful interception targets;
send a response comprising the target database checksum to an indicated node; and
receive an order to start an audit and synchronisation process when the indicated node has determined that the target database checksum is different from a source target database checksum,
wherein the request is received periodically.

22. The arrangement according to claim 21, wherein the instructions, when executed by the processor, further cause the arrangement to:
determine the target database checksum for the target database.

23. The arrangement according to claim 22, wherein the target database checksum for the target database is determined using a Secure Hash Algorithm.

24. The arrangement according to claim 21, wherein the request for the target database checksum is received in a keep-alive check message.

25. The arrangement according to claim 24, wherein the response comprising the target database checksum is sent in a keep-alive response.

26. The arrangement according to claim 21, wherein the request is a request for a subset checksum based on a subset of the target database.

27. The arrangement according to claim 26, wherein said response includes the subset checksum based on the subset of the target database.

28. The arrangement according to claim 21, wherein the order to start the audit and synchronisation process is related to a subset of the target.

* * * * *